United States Patent [19]
Rowas

[11] 3,969,665
[45] July 13, 1976

[54] AUTOMATIC CONTROL CIRCUIT FOR BATTERY CHARGING SYSTEMS

[75] Inventor: Clifford A. Rowas, Cincinnati, Ohio

[73] Assignee: Schauer Manufacturing Corporation, Cincinnati, Ohio

[22] Filed: Dec. 23, 1974

[21] Appl. No.: 535,992

[52] U.S. Cl............................ 320/35; 320/DIG. 2; 320/40; 323/22 SC
[51] Int. Cl.² .......................................... H02J 7/04
[58] Field of Search ................. 320/39, 30, 40, 35, 320/36, DIG. 2, 21; 323/22 SC, 34; 322/28

[56] References Cited
UNITED STATES PATENTS

| | | | |
|---|---|---|---|
| 3,296,516 | 1/1967 | Paine et al. | 320/35 |
| 3,363,163 | 1/1968 | Nord et al. | 320/40 X |
| 3,504,269 | 3/1970 | Hallahan, Jr. | 323/22 SC X |

*Primary Examiner*—J D Miller
*Assistant Examiner*—Robert J. Hickey
*Attorney, Agent, or Firm*—Walter S. Murray

[57] ABSTRACT

The utilization of a pilot SCR in the control circuitry adapted to trigger a pair of SCRs in the power circuit of a battery charging system to maintain automatic off-on control of the system at full battery charged capacity whenever the battery voltage is or falls below its fully charged condition.

2 Claims, 2 Drawing Figures

AUTOMATIC CONTROL CIRCUIT FOR BATTERY CHARGING SYSTEMS

The present invention relates to automatic control circuitry for battery charging systems and more specifically to an improved control responsive to predetermined temperature and battery charging conditions.

The principal object of the invention is to provide a reliable yet simplified off-on relaxation, oscillator control circuit for battery charging, gate controlled rectified systems that includes a battery voltage sensing means and a gate controlled rectifier means actuated by the control circuit to activate the battery charging system in response to sensed battery voltage conditions.

Another object of the invention is to provide a full wave rectified battery charging circuit including a pair of silicon controlled rectifiers, a silicon controlled pilot rectifier having an anode connected to the battery charging circuit, and its cathode connected to the gates of the pair of silicon controlled rectifiers and an oscillator control circuit responsive to battery voltage conditions and having its output connected to the gate of the silicon controlled pilot rectifier, whereby when predetermined voltage conditions exist in the battery the control circuit will render the silicon controlled pilot rectifier conductive and in turn activate the pair of silicon controlled rectifiers to operate the battery charging circuit.

Further objects of the invention are to provide in a control circuit for battery chargers having the foregoing characteristics a simplified temperature compensating means and a battery voltage divider for the control circuit.

A still further object of the invention is to provide an improved charging system over the system disclosed in the patent to Nord et al U.S. Pat. No. 3,363,163, granted Jan. 9, 1968, in that fewer, more reliable and sensitive components are utilized in said improved system.

These and other objects, features and advantages will be disclosed in the course of the following specification, reference being had to the accompanying drawings, wherein.

Figure 1:
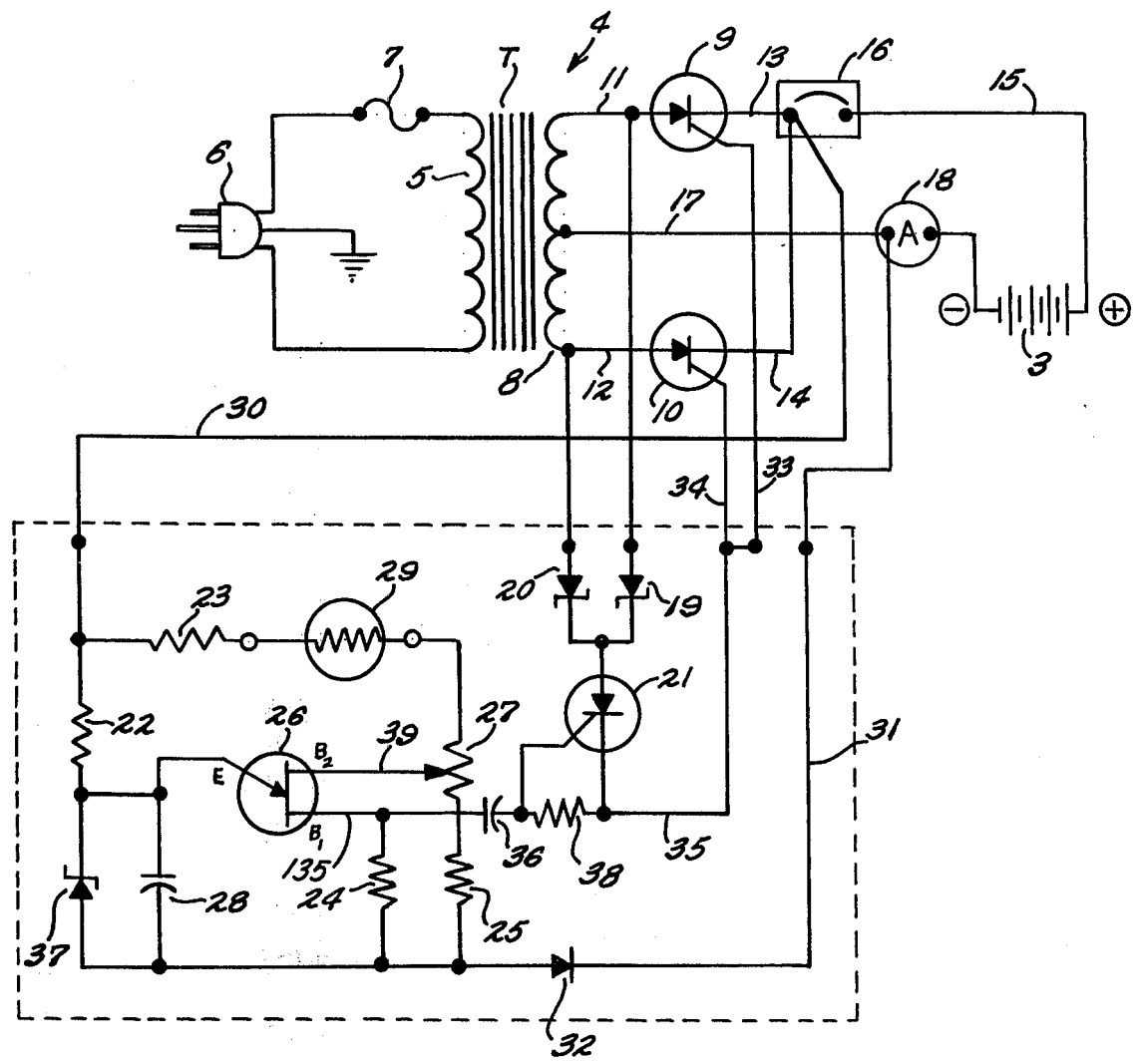
FIG. 1 is a schematic diagram of an exemplary embodiment of the invention.

With reference to FIG. 1 of the drawings the numeral 3 represents a battery to be charged by my system and is electrically connected to a battery charging circuit indicated generally by reference numeral 4. The power source comprises a transformer T whose primary winding 5 is connected to an alternating current outlet through grounded electric plug 6, an overcurrent fuse 7 being interposed in the power circuit. The battery charging circuit includes a center tapped transformer secondary winding 8 and a pair of silicon controlled rectifiers 9 and 10 connected at their anodes by conductors 11 and 12, respectively, to each end of the transformer secondary winding 8. The cathodes of the silicon controlled rectifiers 9 and 10 are both connected by conductors 13 and 14, respectively, to one side of the battery 3, by a common line 15, a circuit breaker 16 being interposed in the common line 15. A center tap lead 17 from the secondary winding 8 is connected through ammeter 18 to the other side of the battery 3. The pair of silicon controlled rectifiers 9 and 10 are normally non-conductive and each time they are fired they become conductive and provide a full wave direct charging current to the battery 3. It will, therefore, be understood that the common cathode connected silicon controlled rectifiers 9 and 10 and the center tapped transformer secondary winding provide a full wave off-on controllable action for the battery charging circuit 4.

The anode terminals of zener diodes 19 and 20 are respectively connected to the conductors 11 and 12 of the secondary winding 8 of transformer T, the cathodes thereof being bridged and connected to the anode of a pilot silicon controlled rectifier 21. The pair of diodes provide a full wave direct current supply for silicon controlled rectifier 21. A relaxation oscillator circuit includes resistors 22, 23, 24 and 25, thermistor 29, voltage sensing potentiometer 27, capacitor 28 and a unijunction transistor 26. This oscillator circuit is connected to the conductors 13 and 14 by a lead line 30 tapped into said circuit between resistors 22 and 23, while the opposed side of the circuit is connected to the center tapped lead 17 of the transformer T by a lead line 31 through a blocking diode 32, the latter preventing conduction of a reverse current into the control circuit if the battery charging system should be inadvertently connected to the battery in a reverse polarity manner.

Gate conductors 33 and 34 of the silicon controlled rectifiers 9 and 10, respectively, are connected to the cathode of the pilot silicon controlled rectifier 21 by a common conductor 35. Base 1 of the unijunction transistor 26 is connected to the gate of pilot silicon controlled rectifier 21 by a control circuit output conductor 135, a capacitor 36 being interposed in said conductor 135. A negative temperature characteristic is provided the oscillator circuit by the resistor 23 and thermistor 29. A zener diode 37 is connected across the delay circuit capacitor 28 which secures a fixed emitter voltage to the unijunction transistor 26. The capacitor 36 functions to capacitively couple the output pulse of the unijunction transistor, developed across resistor 24, to trigger the pilot silicon controlled rectifier 21 which in turn triggers the silicon controlled rectifiers 9 and 10 in the power circuit. A resistor 38 may bridge the gate and cathode of silicon controlled rectifier 21 and functions to prevent triggering of said rectifier 21 by thermally generated leakage current within the device.

The desired control voltage level to initiate the pulsed charging is set and controlled by the potentiometer 27 having its variable contact connected to base 2 of the unijunction transistor 26 by a conductor 39. It is thought desirable to initiate a pulse mode of charging at a duty cycle beginning at a point when the battery reaches approximately 80–85% of full charge and continuing in the pulse charging mode at still a different duty cycle until the battery reaches full charge. The final duty cycle is sufficiently low to allow the charger to remain connected to the battery indefinitely with negligible temperature rise of the battery electrolyte. The difference in the pulse repetition rate or duty cycle for the 80–85% of full charge and full charge is sufficient to allow the ammeter 18 to provide a positive means of determining when the battery has reached its fully charged condition.

The thermistor 29 represented in FIG. 1 of the drawing has a post in each of its leads to indicate that the thermistor may be remotely positioned with respect to the control circuitry board to more closely monitor temperatures around the battery being charged by the system.

The operation of my control circuit will now be described in detail and when the charger is connected to a discharged battery, the terminal voltage is lower than that of a fully charged battery and consequently the sensed voltage applied across the potentiometer 27 and the resistor 25 is lower. The interbase voltage VB2 - B1 of the unijunction transistor 26 is lowered resulting in a lowered peak point voltage Vp of said transistor. The peak point voltage of the unijunction transistor 26 varies in proportion to the interbase voltage VB2-B1 according to the following expression:

$$Vp = n\ VB2{-}B1 + Vd$$

Where $n$ is called the intrinsic stand off ratio and Vd is the equivalent emitter diode voltage. When the battery is discharged the emitter voltage VE is greater than Vp and unijunction transistor 26 turns on and discharges capacitor 28 through the emitter E, base B1 developing a pulsed voltage across resistor 24 which is capacitively coupled to the gate of pilot silicon controlled rectifier 21 causing it to trigger into conduction state which in turn triggers silicon controlled rectifiers 9 and 10 in the power circuit line causing charging current to flow into the battery 3.

In the unijunction relaxation oscillator circuit consisting of the components hereinbefore mentioned, the capacitor 36 is charged through 22 until the emitter voltage reaches a peak point voltage Vp of the transistor 26, at which time said transitor turns on and discharges the capacitor 28 through the resistor 24. When the emitter voltage VE of the unijunction transistor 26 reaches a value of about 2 volts, said transistor 26 turns off and the cycle is repeated. This cycle action generates the pulsed voltage across resistor 24 which triggers the pilot silicon controlled rectifier 21 which in turn triggers silicon controlled rectifiers 9 and 10 in the charging circuit 4. The period of this pulsed type oscillator is given by the following expression:

$$T = \frac{1}{f} = R1\ C1\ \ln\frac{1}{1-n} = 2.3\ R1\ C1\ \log 10\ \frac{1}{1-n}$$

As the battery becomes charged its terminal voltage increases and consequently the sensed voltage applied across the potentiometer 27 and resistor 25 is increased. The interbase voltage VB2-B1 of the unijunction transistor 26 is increased resulting in a higher peak point voltage Vp of said transistor.

When the peak point voltage Vp exceeds the breakdown voltage of zener diode 37, connected across the delay circuit capacitor 28, the transistor 26 will turn off allowing only a small reverse leakage current to flow. The magnitude of the leakage current is sufficiently low to prevent sufficient pulse voltage to be developed across resistor 24 to trigger the pilot silicon controlled rectifier 21 and it turns off. The turnoff of the pilot silicon controlled rectifier 21 causes the silicon controlled rectifiers 9 and 10 to turn off, removing the charging current to the battery. At this point the battery is 80–85% charged. Immediately upon removing the charging current to the battery, the terminal voltage of the battery lowers just sufficiently to turn unijunction transistor 26 and the silicon controlled rectifiers 21, 9 and 10 on again at a low repetition rate or duty cycle. The battery voltage then rapidly builds up until the transistor 26 and the silicon controlled rectifiers 21, 9 and 10 again turn off. The repetition of this cycle event constitutes the pulse control mode and continues to raise the state of charge of the battery from 80–85% of charge, which exists at the initial time of the control action, up to 100% of full charge. Inasmuch as a sensed voltage is derived across the output of the charger or across the terminal voltage of the battery, the unijunction relaxation oscillator control circuit of the charger completely shuts down or ceases to function should any of the following conditions present themselves:

1. A short circuit at the output of the charger.
2. An open circuit at the output of the charger.
3. A battery connected to the charger in reverse polarity manner.

Figure 2:
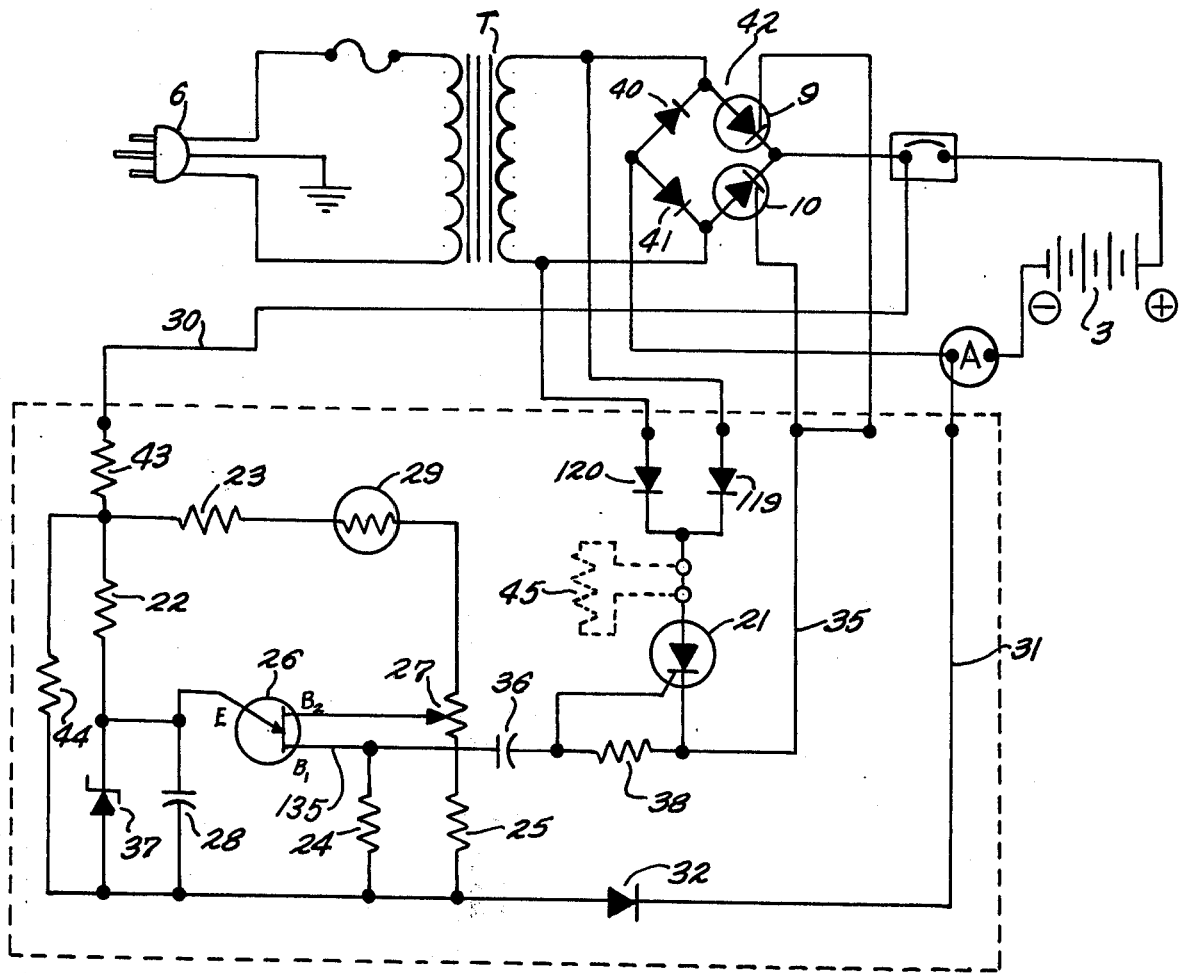
FIG. 2 is a schematic diagram of a modified form of my invention.

Now with reference to FIG. 2 of the drawings which shows a modification of my automatic control circuitry for battery charging systems, said modification differs from the circuitry depicted in FIG. 1 of the drawings in that the silicon controlled rectifiers 9 and 10 form with diodes 40 and 41 a four element, full wave rectifier 42, the lead line 30 has a voltage divider consisting of resistors 43 and 44 interposed therein, the resistor 44 bridging the resistor 22 and the zener diode 37. Also the zener diodes 19 and 20 have been replaced by simple diodes 119 and 120 in the modified circuit. This control functions like that described and depicted in FIG. 1 except that when the charging circuit is connected to a discharged battery the terminal voltage is lower than the fully charged battery and the sensed voltage applied across resistors 43 and 44 is divided to provide a preselected direct current input voltage to the unijunction relaxation oscillator circuit. It is contemplated that resistor 43 of the voltage divider may have different component values thus providing a common control circuit board for the battery charging system ranging from a 12 volt charging circuit to a 48 volt charging circuit.

It is to be noted that in FIG. 2 a resistor 45, shown in dotted lines, may be interposed in the conductor between the silicon controlled rectifier 21 and simple diodes 119 and 120 which functions in some instances to limit the direct current to the silicon controlled rectifier 21.

What is claimed is:
1. A storage battery charging system comprising:
   a transformer having a primary winding connected at its ends to a source of alternating current, and a secondary winding having output leads,
   a first full wave rectifier means connected to the output leads of the secondary winding; said first full wave rectifier means having a pair of direct current output leads connected to the terminals of a storage battery, and which includes a pair of gate controlled rectifiers each interposed in an output lead of the secondary winding,
   a unijunction relaxation oscillator circuit,
   a pilot controlled rectifier,
   a second full wave rectified control circuit connected to the output leads of the secondary winding and consisting of a pair of diodes having their anodes connected to the output leads of the transformer secondary winding and their cathodes electrically connected together, the connected cathodes of said diodes being connected to the anode of the pilot gate controlled rectifier, and the cathode of said pilot gate controlled rectifier being connected to the gates of the pair of gate controlled rectifiers in the said first full wave rectifier means, said unijunction relaxation oscillator circuit being connected across the output terminals of the first full wave rectifier and having a voltage output conduction capacitance coupled to the gate of the pilot gate controlled rectifier, said oscillator circuit including a thermistor in series with a potentiometer and adapted to sense the battery voltage and trigger the pilot gate controlled rectifier when said voltage is or decays below a predetermined full charge, said gate controlled rectifier triggering the pair of gate controlled rectifiers to initiate and maintain the battery charging control of the system and also render the pilot gate controlled rectifier non-conductive to turn off the pair of gate controlled rectifiers when the battery has attained a predetermined charge.

2. The storage battery charging system as set forth in claim 1 wherein the thermistor is remotely positioned with respect to the battery charging system.

* * * * *

UNITED STATES PATENT OFFICE
CERTIFICATE OF CORRECTION

Patent No. 3,969,665     Dated  July 13, 1976

Inventor(s)  Clifford A. Rowas

It is certified that error appears in the above-identified patent and that said Letters Patent are hereby corrected as shown below:

Column 4, Line 60  insert  gate  after "pilot".

Signed and Sealed this

Fourteenth Day of September 1976

[SEAL]

Attest:

RUTH C. MASON
*Attesting Officer*

C. MARSHALL DANN
*Commissioner of Patents and Trademarks*